US006020572A

United States Patent [19]

Marner et al.

[11] Patent Number: 6,020,572

[45] Date of Patent: Feb. 1, 2000

[54] ELECTRODE FOR PLASMA ARC TORCH AND METHOD OF MAKING SAME

[75] Inventors: Alfred William Marner, Florence; Wayne Stanley Severance, Darlington; Larry Wade Stokes, Florence; Tommie Zack Turner, Darlington; Rue Allen Lynch; Valerian Nemchinsky, both of Florence, all of S.C.

[73] Assignee: The Esab Group, Inc., Florence, S.C.

[21] Appl. No.: 09/132,918

[22] Filed: Aug. 12, 1998

[51] Int. Cl.[7] ........ B23K 9/00

[52] U.S. Cl. ........ 219/121.52; 219/121.54

[58] Field of Search ........ 219/121.52, 121.51, 219/121.54

[56] References Cited

U.S. PATENT DOCUMENTS

| | | | |
|---|---|---|---|
| 5,004,888 | 4/1991 | Wolf et al. . | |
| 5,023,425 | 6/1991 | Severance, Jr. . | |
| 5,200,594 | 4/1993 | Okada et al. . | |
| 5,451,379 | 9/1995 | Nemchinsky et al. | 219/121.51 |
| 5,628,924 | 5/1997 | Yoshimitsu et al. . | |
| 5,676,864 | 10/1997 | Walters . | |
| 5,726,414 | 3/1998 | Kitahashi et al. . | |
| 5,844,196 | 12/1998 | Oakley | 219/121.54 |

FOREIGN PATENT DOCUMENTS

| | | |
|---|---|---|
| 4-147772 | 10/1990 | Japan . |

*Primary Examiner*—Teresa Walberg
*Assistant Examiner*—Quang Van
*Attorney, Agent, or Firm*—Alston & Bird LLP

[57] ABSTRACT

An electrode for a plasma arc torch comprises a copper holder having a lower end which mounts an emissive element serving as the cathode terminal for the arc during operation. A relatively non-emissive separator formed of silver alloyed with 0.5 to 4 percent of copper or other metals surrounds the emissive element and separates the emissive element from the copper holder at the exposed end face of the electrode. The separator serves to prevent the arc from detaching from the emissive element and attaching to the copper holder.

12 Claims, 5 Drawing Sheets

ELECTRODE FOR PLASMA ARC TORCH AND METHOD OF MAKING SAME

FIELD OF THE INVENTION

The present invention relates to plasma arc torches and, more particularly, to an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive element embedded therein which supports the arc. The element is composed of a material which has a relatively low work function, which is defined in the art as the potential step, measured in electron volts (ev), which permits thermionic emission from the surface of a metal at a given temperature. In view of its low work function, the element is thus capable of readily emitting electrons when an electrical potential is applied thereto, and commonly used emissive materials include hafnium, zirconium, tungsten, and their alloys.

A significant problem associated with torches of the described type is the short service life of the electrode, particularly when the torch is used with an oxidizing gas such as oxygen or air. More particularly, the gas tends to rapidly oxidize the copper of the electrode which surrounds the emissive element, and as the copper oxidizes its work function decreases. As a result, a point is reached at which the oxidized copper surrounding the emissive element begins to support the arc, rather than the element. When this happens, the copper oxide and the supporting copper melt, resulting in early destruction and failure of the electrode.

The assignee of the present application has previously developed an electrode with significantly improved service life, as described in U.S. Pat. No. 5,023,425, the entire disclosure of which is hereby incorporated herein by reference, and a method for making such an electrode, as described in U.S. Pat. No. 5,097,111, the entire disclosure of which is hereby incorporated herein by reference. The '425 patent discloses an electrode comprising a metallic tubular holder supporting an emissive element at a front end thereof, and having a relatively non-emissive separator or sleeve surrounding the emissive element and interposed between the emissive element and the metallic holder. The sleeve thereby separates the emissive element from the holder. The '425 patent describes the sleeve as preferably being formed of silver which has a high resistance to formation of an oxide. The silver and any oxide thereof which does form are poor emitters, and therefore, the arc will continue to emit from the emissive element rather than from the sleeve or the metallic holder. Service life is thereby significantly extended. The sleeve has an end face flush with the ends of the holder and emissive element, the end face in one embodiment being defined by a radially outwardly extending annular flange portion of the sleeve.

The '111 patent discloses a method for making an electrode which includes the steps of forming a counterbored cavity in the front face of a cylindrical blank of copper or copper alloy, the cavity including an annular outer end portion for receiving the annular flange portion of a non-emissive member. A second metal blank of relatively non-emissive material, preferably silver, is formed to substantially fit within the cavity. The non-emissive blank is then metallurgically bonded into the cavity by first inserting a disk of silver brazing material into the cavity, then inserting the non-emissive blank. The assembly is then heated to a temperature only sufficient to melt the brazing material, and during the heating process the non-emissive blank is pressed into the cavity, which causes the brazing material to flow upwardly and cover the entirety of the interface between the non-emissive blank and the cavity. The assembly is then cooled, resulting in the brazing material metallurgically bonding the element into the non-emissive blank. Next, the non-emissive blank is axially drilled and a cylindrical emissive element is force fitted into the resulting opening. To complete fabrication of the electrode, the front face of the assembly is machined to provide a smooth outer surface which includes a circular outer end face of the emissive element, a surrounding annular ring of the non-emissive blank, and an outer ring of the metal of the holder.

Published Japanese Patent Application No. 4-147772, filed on Oct. 8, 1990 and published on May 21, 1992, describes a plasma arc torch electrode having a copper holder and a cylindrical function insert for supporting an arc, and a metal spacer disposed between the function insert and the holder for establishing thermal and electrical coupling therebetween. As is conventional in plasma arc torches, the holder is cooled by circulating a coolant through the interior of the holder. The patent application describes as an object of the metal spacer to increase the thermal transfer ratio between the holder and the function insert so that improved cooling of the function insert can be attained, which is said to increase the life of the electrode. The metal spacer consists of a hollow cylindrical member open on both ends and surrounding the cylindrical function insert. The metal spacer in one embodiment is composed of a silver alloy containing 24–95 percent silver and 5–74 percent copper. This alloy is said to accomplish the goal of achieving a lower melting point for the metal spacer than for the holder and the function insert, such that the metal layer between the function insert and the holder melts before either of those members and flows between them, thus protecting the holder from the plasma arc and absorbing the heat from the tip end of the function insert by the latent heat of evaporation. The copper content of the alloy is said also to facilitate diffusion bonding both with the copper holder and with the emissive element which is composed of hafnium or an alloy thereof, or zirconium or an alloy thereof. The patent application states that the radial thickness of the metal spacer should be 0.01–0.8 mm, and that greater thickness is undesirable because then the whole metal layer of the spacer can melt and allow the function insert to fall out of the holder.

SUMMARY OF THE INVENTION

The present invention was developed to improve upon the electrode disclosed in the above-referenced '425 patent in terms of the length and consistency of the service life of the electrode, and to provide a method for making an electrode which is simpler than that described in the above-referenced '111 patent. It has been discovered that with the electrode of the '425 patent, the service life can be quite sensitive to the specific composition of the silver alloy used for the non-emissive member, and that the life varies in an unexpected manner with changes in the composition. The present invention provides an electrode having a relatively non-emissive separator made from a specific silver alloy which makes possible significantly increased service life for the electrode.

More particularly, in accordance with one preferred embodiment of the invention, an electrode for supporting an electric arc in a plasma arc torch comprises a metallic holder having a front face with a receptacle formed in the front face. A relatively non-emissive separator is mounted in the receptacle, and has a cavity formed therein. The relatively non-emissive separator is constructed of silver alloyed with 0.5 to 4 percent of a material selected from the group consisting of copper, aluminum, iron, lead, zinc, and alloys thereof. These materials may be in elemental form or in the form of oxides. An emissive element formed of a material having a relatively low work function is mounted in the cavity of the relatively non-emissive separator such that the separator is interposed between and separates the metallic holder from the emissive element at the front face of the holder.

It has been discovered that, surprisingly, the service life of electrodes made in accordance with the invention is greater on average than that of otherwise identical electrodes having the relatively non-emissive separator formed of silver alloy containing substantially more than about 4 percent of copper. Furthermore, it has been found that the service life is degraded if the silver is too pure. For example, electrodes having the relatively non-emissive separator made of substantially pure silver (e.g., 0.9997 fine silver) have significantly shorter service lives on average than otherwise identical electrodes having the relatively non-emissive separator made of silver with 0.5 percent copper.

It has also been found that, surprisingly, the selection of the composition of the separator must take into account the geometry of the separator and the method by which electrodes are constructed in order to assure that electrodes having acceptable service life are produced. For instance, when the separator is sterling silver (92.5 percent silver and the balance copper or other material) and is formed in a rivet-type shape having a cylindrical body and an annular flange which defines the outer face of the separator, it has been found that electrodes have relatively short service lives if they are made by a process of cold deforming the emissive insert and the separator within the copper holder so as to cause those members to expand radially and be gripped and retained in the holder. However, when the same configuration of separator is made of silver having a lower percentage of copper, such as about 2–3 percent, the cold deforming method is capable of producing electrodes having substantially longer service lives. In contrast, where the separator does not include the annular flange, the cold deforming method works well with silver alloys of about 0.25 to 10 percent copper.

Thus, the invention also provides a method for making an electrode for a plasma arc torch which is relatively simple and economical. The method comprises forming a metallic holder by forming a receptacle in a generally planar front face of a metallic blank, the receptacle extending along an axis generally normal to the front face and including an end wall within the blank. A relatively non-emissive separator is formed from a plastically deformable relatively non-emissive material such that the relatively non-emissive separator has an outer surface extending between first and second end faces. The outer surface of the relatively non-emissive separator is configured to fit closely within the receptacle in the metallic holder, and the length of the relatively non-emissive separator is such that the first end face is generally planar and lies adjacent the front end of the metallic holder when the second end face is abutting the end wall of the receptacle. A cavity is formed in the first end face of the relatively non-emissive separator. The method further comprises forming an emissive element from a plastically deformable material having a work function lower than that of the relatively non-emissive separator, such that the emissive element is slidably insertable into the cavity in the separator and when fully inserted thereinto substantially completely fills the cavity and has an end face lying generally flush with the first end face of the separator.

To assemble the electrode, the separator is inserted into the receptacle of the metallic holder such that the second end face of the separator abuts the end wall of the receptacle and the first end face of the separator is adjacent the front face of the metallic holder. The emissive element is inserted into the cavity of the separator until the end face of the emissive element is generally flush with the first end face of the separator. Force is then applied to the end face of the emissive element and the first end face of the separator in a direction generally parallel to the axis of the metallic holder so as to plastically deform the emissive element and the separator radially outwardly until the emissive element is tightly gripped and retained by the relatively non-emissive separator and the separator is tightly gripped and retained by the metallic holder.

In one preferred embodiment of the method, the separator is formed to have a hollow cylindrical body and a bottom wall which closes one end of the body, and the separator is constructed of silver alloyed with about 0.25 to 10 percent of copper.

In another preferred embodiment of the invention, the separator is formed to have a hollow cylindrical body, a bottom wall closing one end of the body, and an annular flange joined to the other end of the body. The separator is constructed of silver alloyed with about 0.5 to 4 percent, and more preferably 2–3 percent, of copper.

Advantageously, the emissive element and the relatively non-emissive separator are plastically deformed by striking the end face of the emissive element and the first end face of the separator with a generally planar circular working surface of a tool, the outer diameter of the working surface being slightly smaller in diameter than the receptacle of the metallic holder.

Preferably, a generally flat end face is then formed on the electrode by machining the front end of the metallic holder, the first end face of the relatively non-emissive separator, and the end face of the emissive element to be generally flat and flush with one another.

BRIEF DESCRIPTION OF THE DRAWINGS

The aforementioned and other objects, features, and advantages of the invention will become more apparent from the following description of certain preferred embodiments thereof, when taken in conjunction with the accompanying drawings in which.

DETAILED DESCRIPTION OF THE DRAWINGS

Figure 1:
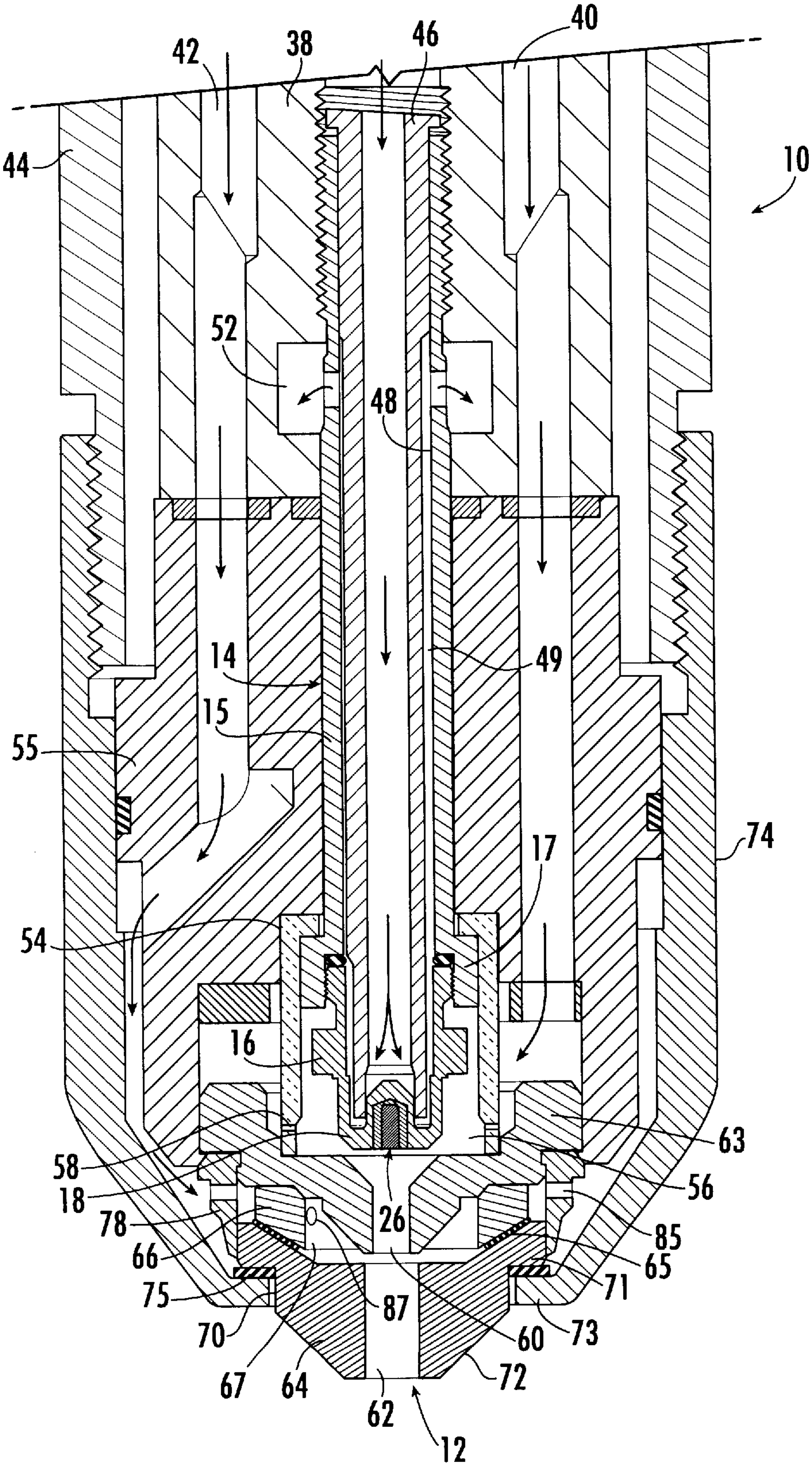
FIG. 1 is a sectioned side elevational view of a plasma arc torch which embodies the features of the present invention.
Figure 2:
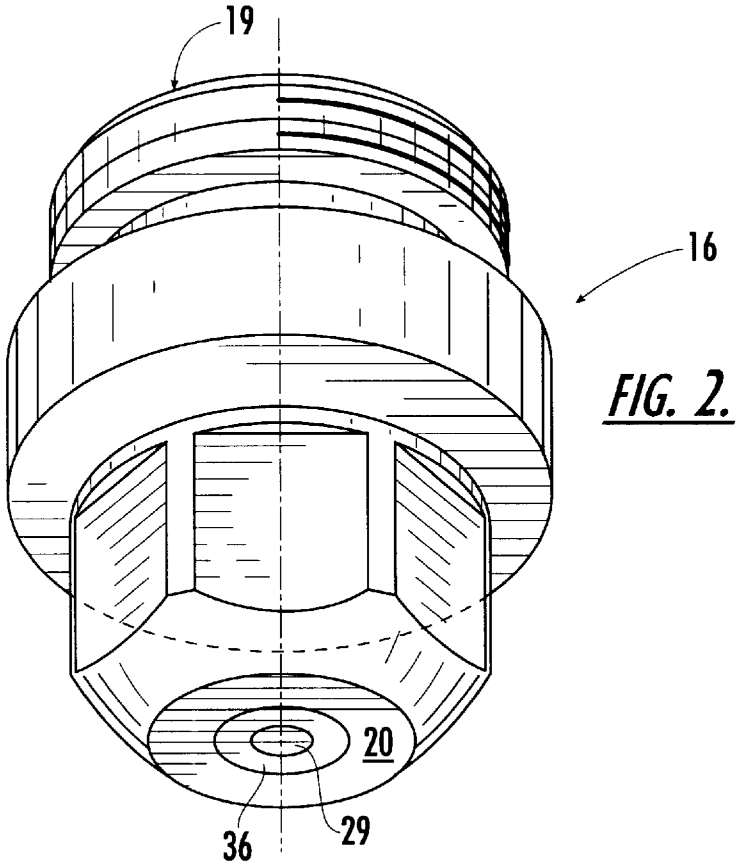
FIG. 2 is an enlarged perspective view of an electrode in accordance with the present invention.

With reference to FIG. 1, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20 (FIG. 2). The rear end of the holder 16 is externally threaded and is threadedly joined to the lower end portion 17 of the upper tubular member 15.

Figure 3:
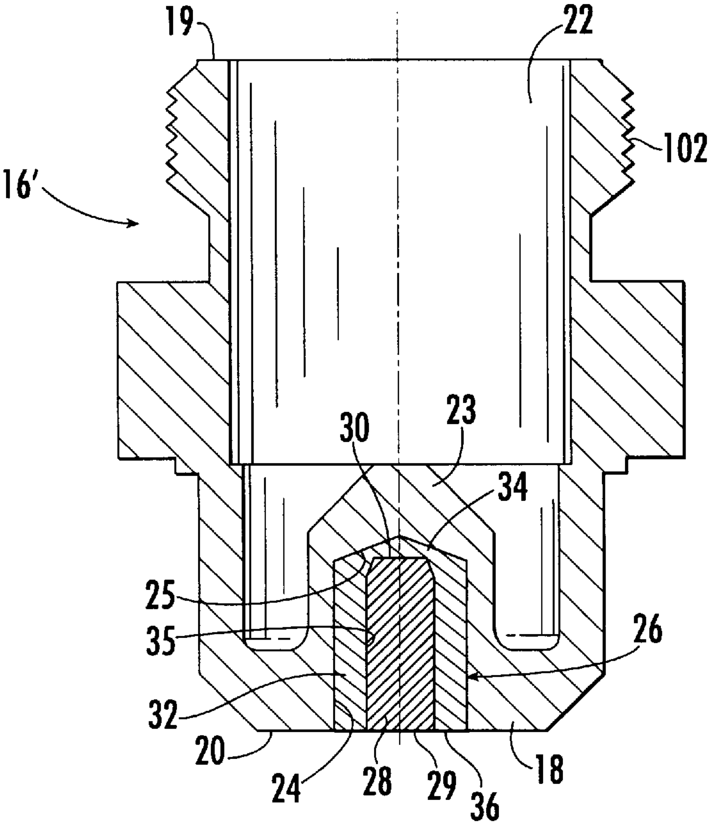
FIG. 3 is an enlarged sectioned side elevational view of an electrode in accordance with the present invention.

With primary reference to FIGS. 2 and 3, the holder 16 is open at the rear end 19 thereof such that the holder is of cup-shaped configuration and defines an internal cavity 22. The front end wall 18 of the holder includes a cylindrical post 23 which extends rearwardly into the internal cavity 22 and along the longitudinal axis. A receptacle 24 is formed in the front face 20 of the end wall 18 and extends rearwardly along the longitudinal axis and into a portion of the length of the post 23. The receptacle 24 is generally cylindrical, and preferably includes a conical inner end wall 25. Preferably, the half angle of the conical inner end wall 25 is about 65° to 75°.

An emissive element assembly 26 is mounted in the receptacle 24 and comprises a generally cylindrical emissive element 28 which is disposed coaxially along the longitudinal axis and which has a circular outer end face 29 lying in the plane of the front face 20 of the holder 16. The emissive element 28 also includes a generally circular inner end face 30 which is disposed in the receptacle 24 and is opposite the outer end face 29. The emissive element 28 is composed of a metallic material which has a relatively low work function, in a range of about 2.7 to 4.2 ev, and so that it is adapted to readily emit electrons upon an electrical potential being applied thereto. Suitable examples of such materials are hafnium, zirconium, tungsten, and alloys thereof.

Figure 4:
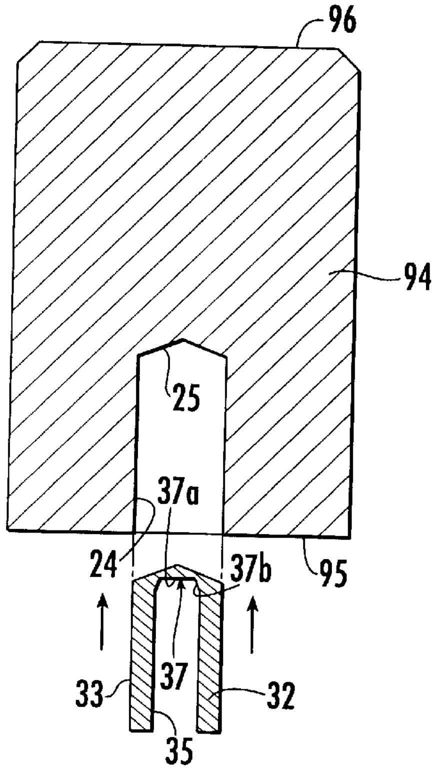
FIGS. 4–7 are schematic views illustrating the steps of a preferred method of fabricating the electrode in accordance with the invention.

The emissive element assembly 26 also includes a relatively non-emissive separator 32 which is positioned in the receptacle 24 coaxially about the emissive element 28. The separator 32 may have a peripheral wall 33 (FIGS. 4–5) extending the length of the emissive element 28 and a closed bottom wall 34. The peripheral wall 33 is illustrated as having a substantially constant outer diameter over the length of the separator, although it will be appreciated that other geometric configurations would be consistent with the scope of the invention. When the receptacle 24 includes the conical end wall 25, the closed bottom wall 34 preferably defines an outer end face that is conical such that it matches the shape of the conical end wall 25. The separator 32 includes an opening such as a cylindrical cavity 35 formed therein in the form of a blind cylindrical hole coaxial with the longitudinal axis, and the emissive element 28 substantially completely fills the cavity 35. As best seen in FIG. 4, the bottom wall 34 of the separator defines an inner surface 37 against which the emissive element 28 abuts. The inner surface 37 preferably is formed to have a planar circular center portion 37*a* perpendicular to the longitudinal axis and a frustoconical outer portion 37*b* coaxial with the longitudinal axis. The half angle of the frustoconical portion 37*b* preferably is about 30°. The emissive element 28 preferably has the inner end face 30 formed to match the shape of the inner surface 37, and thus the inner end face 30 includes a planar circular center portion 30*a* and a frustoconical outer portion 30*b* (FIG. 6) having a half angle of about 30°.

The separator 32 also includes an outer end face 36 which is generally flush with the circular outer end face 29 of the emissive element 28, and is also generally flush with the front face 20 of the holder 16. The separator 32 preferably has a radial thickness of at least about 0.25 mm (0.01 inch) at the outer end face 36 and along its entire length, and preferably the diameter of the emissive element 28 is about 30–80 percent of the outer diameter of the end face 36 of the separator. As a specific example, the emissive element 28 typically has a diameter of about 2 mm (0.08 inch) and a length of about 6 mm (0.24 inch), and the outer diameter of the separator 32 is about 4 mm (0.16 inch).

The separator 32 is composed of a metallic material having a work function which is greater than that of the material of the holder 16, and also greater than that of the material of the emissive element 28. More specifically, it is preferred that the separator be composed of a metallic material having a work function of at least about 4.3 ev.

In accordance with the present invention, the separator 32 is formed of a silver alloy material comprising silver alloyed with about 0.5 to 4 percent of an additional material selected from the group consisting of copper, aluminum, iron, lead, zinc, and alloys thereof. As previously noted, the additional material may be in elemental or oxide form, and thus the term "copper" as used herein is intended to refer to both the elemental form as well as the oxide form, and similarly for the terms "aluminum" and the like. It has been discovered that, unexpectedly, the service life of the electrode is degraded if the separator is formed of silver that is too pure, for example, 0.9997 fine silver. It has also been discovered that if the separator is formed of silver containing substantially more than 3 percent of copper, the service life of the electrode begins to decline. Thus, there tends to be an optimum range of about 0.5 to 4 percent for the additional material of the silver alloy which yields an optimum service life for the electrode.

More preferably, the separator is constructed of silver alloyed with about 1.5 to 3.5 percent of the additional material. Copper is preferred for the additional material, and a particularly preferred alloy percentage is about 2–3 percent copper. While not wishing to be bound by theory, the inventors believe that one possible explanation for the unexpected advantages of the present invention is that the impurities (i.e., the copper) raise the work function of the silver or in some other way reduce the likelihood of the silver supporting the arc. Another possible explanation is that pure silver has a relatively low tensile yield strength, and accordingly a separator made of substantially pure silver may allow a gap to open between the separator and the copper holder when the torch is shut off and the electrode cools (since silver has a greater coefficient of thermal expansion than copper). The gap tends to cause overheating of the separator during subsequent operation. By virtue of the addition of copper to the silver, the separator may not yield as much under the stress of thermal expansion, and this may explain why electrodes made with the silver-copper separators have less propensity to developing gaps at the interface between the copper holder and the separator.

With reference again to FIG. 1, in the illustrated embodiment, the electrode 14 is mounted in a plasma arc torch body 38, which includes gas and liquid passageways 40 and 42, respectively. The torch body 38 is surrounded by an outer insulated housing member 44.

A tube 46 is suspended within the central bore 48 of the electrode 14 for circulating a liquid cooling medium such as water through the electrode structure 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, along the post 23 in the holder 16, and back through the space 49 to the opening 52 in the torch body 38 and to a drain hose (not shown). The passageway 42 directs injection water into the nozzle assembly 12 where it is converted into a swirling vortex for surrounding the plasma arc as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out from the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14.

The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 which defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which inject the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece which is usually grounded. In operation, a plasma arc is established between the emissive element 28 of the electrode which acts as the cathode terminal for the arc, and the workpiece which is connected to the anode of the power supply and which is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

METHOD OF FABRICATION

The invention also provides a simplified method for fabricating an electrode of the type described above. FIGS. 4–7 illustrate a preferred method of fabricating the electrode in accordance with the present invention. As shown in FIG. 4, a cylindrical blank 94 of copper or copper alloy is provided having a front face 95 and an opposite rear face 96. A generally cylindrical bore is then formed, such as by drilling, in the front face 95 so as to form the receptacle 24 as described above.

A separator 32 is formed of a silver alloy material. As previously described, the silver alloy material for the hollow cylindrical separator 32 comprises silver alloyed with about 0.25 to 10 percent of copper. The separator is configured and sized to closely fit within the receptacle 24. The separator 32 may be formed by first forming a generally cylindrical solid blank and then forming a cylindrical cavity 35 coaxially therein, such as by drilling.

Figure 5:
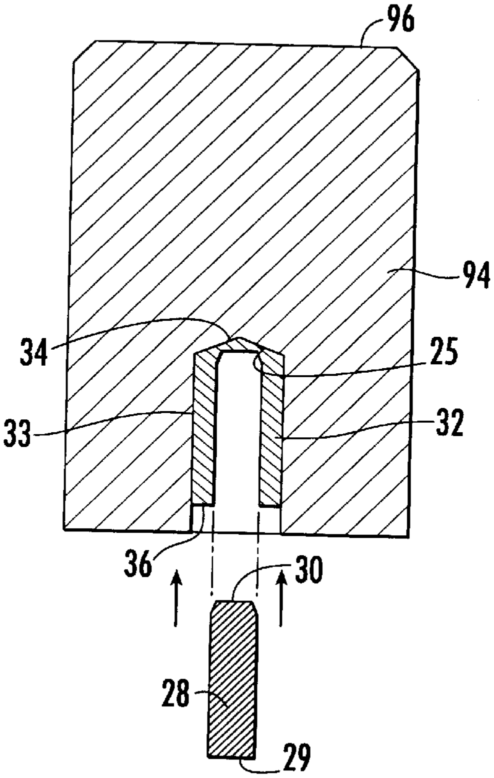

Next, as shown in FIG. 5, a generally cylindrical emissive element 28 is formed of a metallic material having a relatively low work function, as described above. The emissive element 28 is sized to closely fit within and to substantially completely fill the cavity 35 in the separator 32. The emissive element 28 is inserted into the cavity 35 until the inner end 30 of the element 28 abuts the closed end wall 34 of the separator 32, and the outer circular end face 29 of the element is generally flush with the outer end face 36 of the separator 32.

Figure 6:
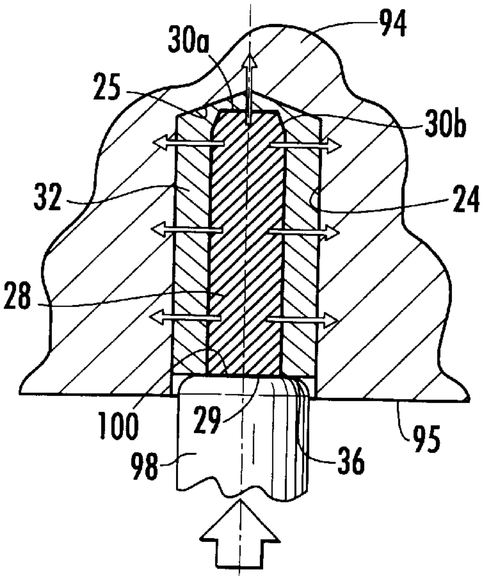
Figure 7:
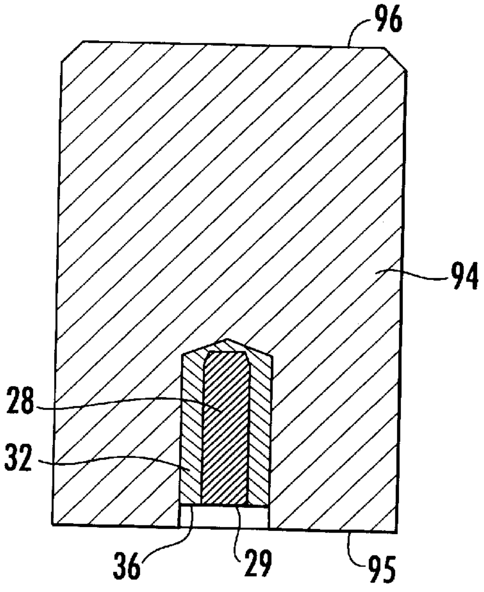

With reference to FIG. 6, a tool 98 having a generally planar circular working surface 100 is placed with the working surface 100 in contact with the end face 29 and the end face 36 of the emissive element and separator, respectively. The outer diameter of the working surface 100 is slightly smaller than the diameter of the receptacle 24 in the holder blank 94. The tool 98 is held with the working surface 100 generally coaxial with the longitudinal axis of the emissive element 28, and force is applied to the tool so as to impart axial compressive forces to the emissive element 28 and the separator 32 along the longitudinal axis. For example, the tool 98 may be positioned in contact with the element and separator and then struck by a suitable device such as the ram of a machine. Regardless of the specific technique used, sufficient force is imparted so as to cause the emissive element 28 and the separator 32 to be deformed radially outwardly such that the emissive element 28 is tightly gripped and retained by the separator 32, and the separator 32 is tightly gripped and retained by the metallic holder blank 94, as shown in FIG. 7.

To complete the fabrication of the holder 16, the rear surface 96 of the blank 94 is machined to form the open cup-shaped configuration having the cavity 22 therein and having an internal annular recess which coaxially surrounds the receptacle 24 so as to form the cylindrical post 23, as shown in FIG. 3. The external periphery of the blank 94 is also shaped as desired, including formation of external threads 102 at the rear end. Finally, the front face 95 of the blank 94 and the end faces 29 and 36 of the emissive element and separator, respectively, are machined so that they are substantially flat and flush with one another.

Figure 8:
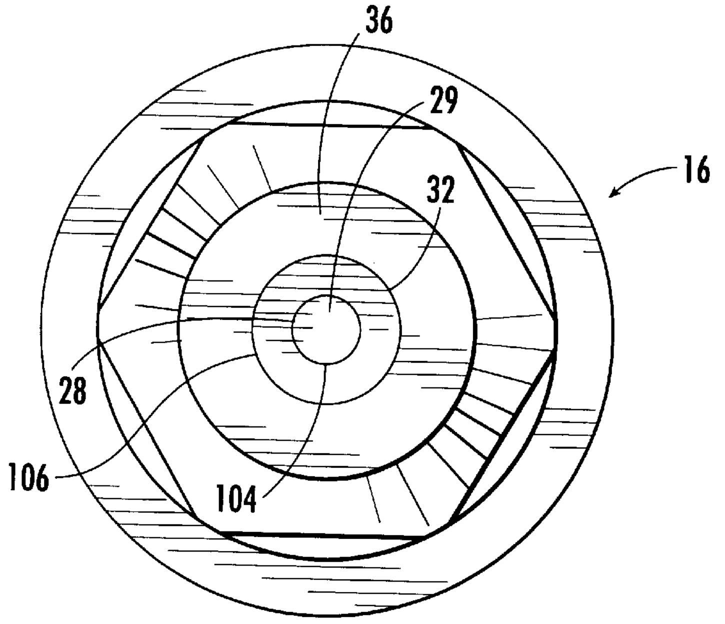
FIG. 8 is an end elevational view of the finished electrode.

FIG. 8 depicts an end elevation view of the finished electrode 16. It can be seen that the end face 36 of the separator 32 separates the circular end face 29 of the emissive element from the front face 20 of the holder 16. The end face 36 is annular having an inner perimeter 104 and an outer perimeter 106. Because the separator 32 is formed of the silver alloy material having a higher work function than that of the emissive element 28, the separator 32 serves to discourage the arc from detaching from the emissive element 28 and becoming attached to the holder 16. Preferably, the radial thickness of the end face 36 between the inner perimeter 104 and the outer perimeter 106 is at least about 1 mm.

As previously noted, the invention also encompasses separators having configurations other than purely cylindrical. For example, the invention encompasses rivet-type separators having a hollow cylindrical body and an annular flange joined to the open end of the body. However, as mentioned above, the cold deformation process of manufacturing the electrode described above has been found to result in unacceptable electrodes, in terms of service life, when rivet-type electrodes are made of silver alloyed with higher percentages of copper, such as sterling silver which contains 7.5 percent copper. When electrodes are made through the cold deformation process with rivet-type separators, it has been found that, unexpectedly, significantly longer service life is obtained on average when the percentage of copper is reduced to below about 5 percent, specifically about 0.5 to 4 percent. More preferably, the rivet-type separator should contain about 2–3 percent copper.

Figure 9:
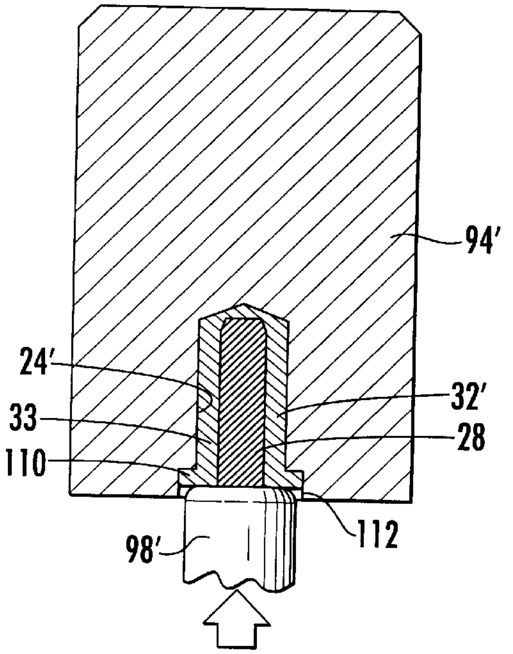
FIG. 9 is a view similar to FIG. 6, showing the forming method of the invention as applied to an electrode having a rivet-type separator.
Figure 10:
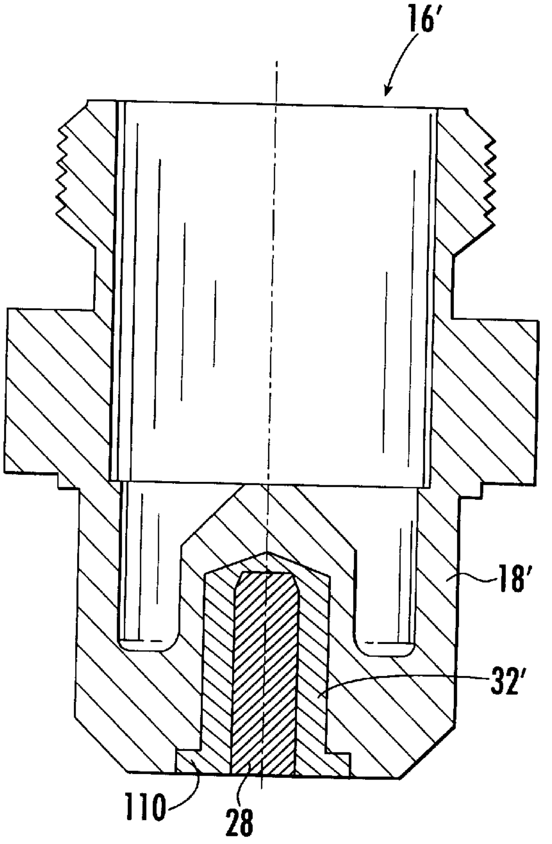
FIG. 10 is a view similar to FIG. 3, showing the finished electrode having the rivet-type separator.

Thus, the invention also includes a further preferred embodiment as illustrated in FIGS. 9 and 10. FIG. 9 depicts a preferred method of the invention in which a blank 94' is provided with a stepped or counterbored receptacle 24' for receiving a rivet-type separator 32'. The separator 32' has a hollow cylindrical body 33' and an annular flange 110 joined to the open end of the body. The receptacle 24' is shaped similarly to the separator, and thus includes a counterbored portion 112 of larger diameter than the remainder of the receptacle. A tool 98' is used to apply force to the end face of the emissive element 28 and to the outer face of the annular flange 110 so as to cause radial expansion of the emissive element and separator, as previously described. The electrode is then finished as described above, resulting in a completed electrode 16' as shown in FIG. 10. The electrode 16' includes a holder 18', separator 32', and emissive element 28.

As a specific example, the emissive element 28 has a diameter at its end face 29 of about 2mm (0.08 inch), and the outer diameter of the separator's annular flange 110 is about 6.3 mm (0.25 inch). The separator 32' advantageously is formed of silver alloyed with about 0.5 to 4 percent of copper, and more preferably about 2–3 percent copper.

Testing was performed to investigate the effect of the specific silver alloy composition on electrode service life. A number of identically configured electrodes having rivet-type separators as shown in FIG. 10 were prepared in accordance with the cold deforming process described above. The copper content of the separator was varied from about zero percent (i.e., substantially pure silver) to about 7.5 percent, by preparing specially formulated heats of silver-copper alloy and manufacturing separators from the special heats. Each of the electrodes was installed into a plasma arc torch and the torch was operated cyclically for 30 seconds with the arc on (at 400 amps) and 4 seconds with the arc off, repeating the on-off cycle until a "failure" was observed. A "failure" was characterized either by total destruction of the electrode, such as when the electrode exploded (relatively rare), or by a physical change in the nozzle of the torch, such as a nick, groove, or the like, indicating that the arc was not properly centered on the emissive element of the electrode and/or that a double arc had become established.

Figure 11:
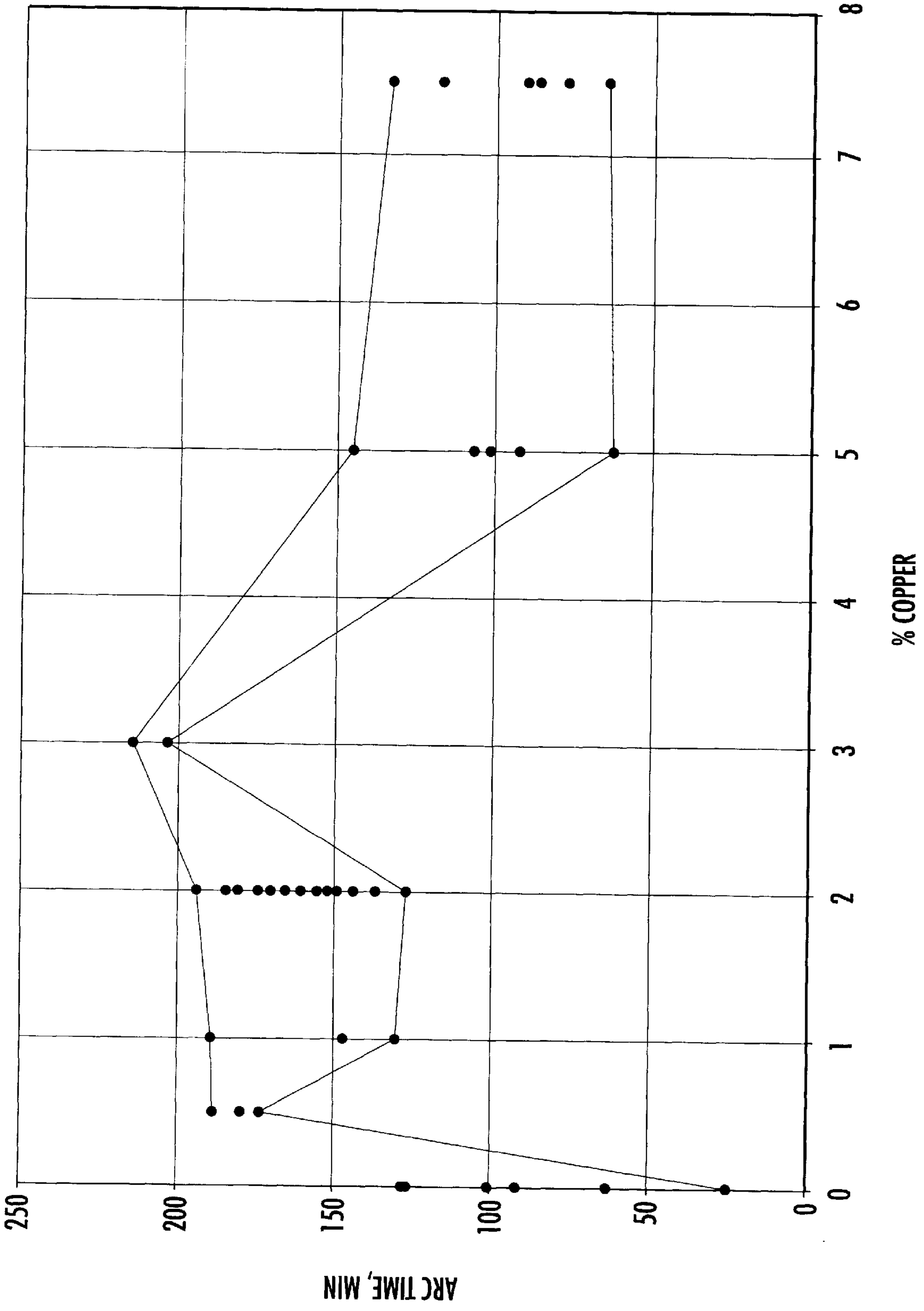
FIG. 11 is a graph which presents results of testing electrodes made in accordance with the invention, showing total electrode life as a function of the percentage of copper content for the silver alloy separator.

FIG. 11 presents the results of the series of electrode tests. It can be seen that at about zero percent copper content, electrode life ranges from about 22 minutes to about 127 minutes. For 7.5 percent copper content (sterling silver), the life ranges from about 65 minutes to about 135 minutes. Although only two data points were obtained at 3 percent copper content, both of the tests exceeded 200 minutes of electrode life. A substantial number of data points were taken at 2 percent copper content, the life ranging from about 126 minutes to about 195 minutes, with the average being about 157 minutes. Three data points were obtained at 0.5 percent copper, the life ranging from about 174 minutes to about 189 minutes.

Thus, the data exhibit a remarkable and unexpected trend suggesting that an optimal range for copper content exists from about 0.5 percent to about 4 percent (although no data points were obtained at 4 percent, the data suggest that 4 percent would provide a significant improvement in electrode life compared to the data obtained at 5 percent copper). Furthermore, although there is considerable scatter in the data, the data nevertheless suggest that a peak occurs in the 2–3 percent copper range.

While the invention has been explained by reference to certain preferred embodiments thereof, and while these embodiments have been described in considerable detail, it will be understood that the invention is not limited to the described embodiments. Modifications and substitutions of equivalents may be made without departing from the scope of the invention as set forth in the appended claims.

What is claimed is:

1. An electrode for supporting an electric arc in a plasma arc torch, and comprising:

a metallic holder having a front face and a receptacle formed in the front face;

a relatively non-emissive separator mounted in the receptacle and constructed of silver alloyed with 0.5 to 4 percent of an additional material selected from the group consisting of copper, aluminum, iron, lead, zinc, and alloys thereof, the separator defining an opening therein; and an emissive element composed of a metallic material having a relatively low work function, the emissive element extending at least partially in the opening of the separator such that the separator is interposed between and separates the metallic holder from the emissive element at the front face of the holder, whereby the separator acts to resist detachment of the electric arc from the emissive element and attachment of the arc to the metallic holder.

2. The electrode of claim 1, wherein the separator is constructed of silver alloyed with about 1.5 to 3.5 percent of the additional material.

3. The electrode of claim 1, wherein the separator is constructed of silver alloyed with about 2–3 percent of copper.

4. The electrode of claim 1, wherein the separator comprises a hollow cylinder having a bottom wall closing one end thereof such that the opening is formed as a blind cylindrical hole, the separator including an annular end face at the other end of the separator, and the emissive element being cylindrical and substantially completely filling the opening.

5. The electrode of claim 4, wherein the annular end face of the separator has an outer diameter and is generally planar and the emissive element has a generally planar circular front face generally flush with the annular end face of the separator, the front face having a diameter less than about 80 percent of the outer diameter of the annular end face of the separator.

6. The electrode of claim 5, wherein the annular end face of the separator includes inner and outer perimeters defining a radial thickness therebetween, and wherein the radial thickness of the annular end face of the separator is at least about 1 mm.

7. The electrode of claim 1, wherein the receptacle includes a cylindrical bore having a conical inner end wall, and the separator includes a hollow cylinder having an end wall which defines a conical end face shaped to match the conical end wall of the receptacle, the conical end face of the separator abutting the conical inner end wall of the receptacle.

8. A plasma arc torch, comprising:

an electrode which includes:

a metallic holder having a front face and a receptacle formed in the front face, the holder defining a longitudinal axis;

a relatively non-emissive separator mounted in the receptacle and constructed of silver alloyed with 0.5 to 4 percent of an additional material selected from the group consisting of copper, aluminum, iron, lead, zinc, and alloys thereof, the separator defining an opening therein; and an emissive element composed of a metallic material having a relatively low work function, the emissive element extending at least partially in the opening of the separator such that the separator is interposed between and separates the metallic holder from the emissive element at the front face of the holder;

a nozzle mounted adjacent the front face of the holder and having a flow path therethrough which is aligned with the longitudinal axis;

an electrical supply for creating an arc extending from the emissive element of the electrode through the nozzle flow path and to a workpiece located adjacent the nozzle; and a gas supply for creating a flow of a gas between the electrode and the nozzle and so as to create a plasma flow outwardly through the nozzle flow path and to the workpiece.

9. The plasma arc torch of claim 8, wherein the separator is constructed of silver alloyed with about 1.5 to 3.5 percent of copper.

10. The plasma arc torch of claim 5, wherein the receptacle includes a cylindrical bore having a conical inner end wall, and the separator includes a hollow cylindrical body having an end wall which defines a conical end face shaped to match the conical end wall of the receptacle, the conical end face of the separator abutting the conical inner end wall of the receptacle.

11. The plasma arc torch of claim 10, wherein the diameter of the outer end face of the emissive element is about 30–80 percent of the outer diameter of the annular end face of the separator.

12. The plasma arc torch of claim 8, wherein the radial thickness of the annular end face of the separator is at least about 1 mm.

* * * * *

UNITED STATES PATENT AND TRADEMARK OFFICE
CERTIFICATE OF CORRECTION

PATENT NO. : 6,020,572

DATED : February 1, 2000

INVENTOR(S) : Marner et al.

It is certified that error appears in the above-identified patent and that said Letters Patent is hereby corrected as shown below:

Title page, [56] References Cited, U.S. PATENT DOCUMENTS, line 4, "5,451,379" should read --5,451,739--.

Column 12, line 25, "claim 5" should read --claim 8--.

Signed and Sealed this

Twenty-eighth Day of November, 2000

*Attest:*

Q. TODD DICKINSON

*Attesting Officer*

*Director of Patents and Trademarks*